United States Patent
Xu et al.

(10) Patent No.: US 9,528,500 B2
(45) Date of Patent: Dec. 27, 2016

(54) SYSTEM FOR LUBRICATING GEARS IN A WIND TURBINE

(71) Applicant: General Electric Company, Schenectady, NY (US)

(72) Inventors: Junqing Xu, Shanghai (CN); Shijiang Liu, Shanghai (CN); Ting Gu, Shanghai (CN)

(73) Assignee: General Electric Company, Schenectady, NY (US)

( * ) Notice: Subject to any disclaimer, the term of this patent is extended or adjusted under 35 U.S.C. 154(b) by 165 days.

(21) Appl. No.: 14/511,224

(22) Filed: Oct. 10, 2014

(65) Prior Publication Data

US 2015/0114756 A1    Apr. 30, 2015

(30) Foreign Application Priority Data

Oct. 30, 2013    (CN) .......................... 2013 2 0678647

(51) Int. Cl.
*F03D 11/00* (2006.01)
*F16H 57/04* (2010.01)

(52) U.S. Cl.
CPC ........... *F03D 11/0008* (2013.01); *F03D 80/70* (2016.05); *F16H 57/0431* (2013.01); *F05B 2260/79* (2013.01); *F05B 2260/98* (2013.01); *Y02E 10/722* (2013.01)

(58) Field of Classification Search
CPC ... F03D 11/0008; F03D 80/70; F16H 57/0431
USPC .......................................................... 184/4
See application file for complete search history.

(56) References Cited

U.S. PATENT DOCUMENTS

| | | | |
|---|---|---|---|
| 3,424,022 A * | 1/1969 | Greenberg | .......... F16H 57/0431 74/409 |
| 5,379,662 A | 1/1995 | Livio | |
| 5,622,239 A * | 4/1997 | Orlitzky | .............. F16H 57/0463 184/39 |
| 7,244,097 B2 * | 7/2007 | Hinz | ..................... F03D 7/0224 415/122.1 |
| 8,047,332 B2 | 11/2011 | Salmela et al. | |
| 8,196,489 B2 * | 6/2012 | Paluncic | ................. F04C 2/084 74/468 |
| 2007/0081896 A1 * | 4/2007 | Mollhagen | .............. F03D 80/70 416/98 |
| 2008/0276743 A1 * | 11/2008 | Salmela | .............. F16H 57/0431 74/467 |

(Continued)

OTHER PUBLICATIONS

"Intergrated Lubrication Supply for Blade and Yaw Gearboxes, Economic and Effiecient", Liebherr, 2014. https://www.liebherr.com/shared/media/products/images/wind-special/windenergy-components/windenergy-components-downloads/liebherr-components-integrated-lubrication-supply-en-download-12-2014-en.pdf.

*Primary Examiner* — Michael Riegelman
(74) *Attorney, Agent, or Firm* — James W. Pemrick; Ernest G. Cusick; Frank A. Landgraff

(57) ABSTRACT

A system for lubricating gears includes a drive pinion configured to interact with bearing teeth. The drive pinion includes an internal axially extending lubricant channel connected to a plurality of radially extending lubricant delivery conduits. The plurality of radially extending lubricant delivery conduits extend from the internal axially extending lubricant channel radially outward to a radial surface of the drive pinion. The system is configured to transport lubricant from the internal lubricant channel through the plurality of lubricant delivery conduits to the radial surface to lubricate the drive pinion and the bearing teeth.

13 Claims, 9 Drawing Sheets

(56) References Cited

U.S. PATENT DOCUMENTS

2011/0243741 A1    10/2011  Eriksen et al.
2013/0192930 A1*  8/2013  Segovia .............. F03D 11/0008
                                                                               184/14
2014/0286775 A1*  9/2014  Pasquet ............... F16H 57/0431
                                                                               416/155
2015/0114758 A1*  4/2015  Casals Terre .......... F16H 55/17
                                                                               184/6.12

* cited by examiner

SYSTEM FOR LUBRICATING GEARS IN A WIND TURBINE

BACKGROUND OF THE INVENTION

The embodiments described herein relate generally to wind turbines, and more particularly, to systems and methods for lubricating gears in a wind turbine, especially components of pitch and yaw assemblies.

At least some known wind turbines include a bearing coupled between a blade and a hub, and a pitch assembly for use in positioning the blade attached to the bearing. The pitch assembly is operated to adjust the pitch of the blade. Over time, the pitch bearing teeth of the bearing may become worn. As the pitch bearing teeth become worn, the pitch assembly becomes less effective in operating to adjust the pitch of the blades. In some cases, the pitch bearing teeth can fail resulting in the inability of the pitch drive system to rotate the blade. In at least some known wind turbines, the entire hub must be removed from the wind turbine, prior to removing each blade and adjusting the pitch bearing to engage new pitch bearing teeth. In some wind turbines, the blades are between 60 and 100 meters in length, and as such, replacing worn pitch bearing teeth can be costly and time-consuming.

During operation worn pitch bearing teeth may enable a blade to undesirably move from a desired pitch setting. In some cases, the blades of the wind turbine asymmetrically load the hub and rotor shaft, and may cause the rotor to become imbalanced. Depending on the extent of the rotor imbalances, increased loads may be induced to the rotor and other drive train components. Moreover, the rotor's position with respect to the wind may induce increased loads on the rotor and other drive train components.

BRIEF DESCRIPTION OF THE INVENTION

In an aspect of the present invention, a system for lubricating gears includes a drive pinion configured to interact with bearing teeth. The drive pinion includes an internal lubricant container connected to a plurality of lubricant delivery conduits. The lubricant delivery conduits extend from the internal lubricant container radially outward to a radial surface of the drive pinion. The system is configured to transport lubricant from the internal lubricant container through the plurality of lubricant delivery conduits to the radial surface to lubricate the drive pinion and the bearing teeth.

In another aspect of the present invention, a system for lubricating gears includes a drive pinion configured to interact with bearing teeth. The drive pinion includes an internal axially extending lubricant channel connected to a plurality of radially extending lubricant delivery conduits. The radially extending lubricant delivery conduits extend from the internal axially extending lubricant channel radially outward to a radial surface of the drive pinion. The system is configured to transport lubricant from the internal lubricant channel through the plurality of lubricant delivery conduits to the radial surface to lubricate the drive pinion and the bearing teeth.

In yet another aspect of the present invention, a system for lubricating gears includes a drive pinion configured to interact with bearing teeth. The drive pinion includes an internal axially extending lubricant channel connected to a plurality of radially extending lubricant delivery conduits. The plurality of radially extending lubricant delivery conduits extend from the internal axially extending lubricant channel radially outward to a radial surface of the drive pinion. A plurality of check valves are located in at least some of the radially extending lubricant delivery conduits. The check valves are configured to permit lubrication flow only in a radially outward direction. A trigger switch activated piston is located in one of the radially extending lubricant delivery conduits. The trigger switch activated piston is configured to increase lubrication pressure within the axially extending lubricant channel during meshing of the drive pinion and the bearing teeth. The system is configured to transport lubricant from the internal axially extending lubricant channel through the plurality of radially extending lubricant delivery conduits to the radial surface to lubricate the drive pinion and the bearing teeth In a still further aspect of the present invention, a system for lubricating gears includes a drive pinion having a plurality of pinion teeth, and a bearing having a plurality of bearing teeth. The bearing is configured for use with the drive pinion. A first plate is attached to a first axial side of the plurality of bearing teeth in a vicinity of the drive pinion, and the first plate includes one or more lubricant inlets. A second plate is attached to a second axial side of the plurality of bearing teeth in a vicinity of the drive pinion, and the second plate includes one or more lubricant outlets. The second plate is located substantially opposite to the first plate. The first plate and the second plate are configured to retain lubricant around a portion of the plurality of pinion teeth and the plurality of bearing teeth contained between the first plate and the second plate.

DETAILED DESCRIPTION OF THE INVENTION

One or more specific aspects/embodiments of the present invention will be described below. In an effort to provide a concise description of these aspects/embodiments, all features of an actual implementation may not be described in the specification. It should be appreciated that in the development of any such actual implementation, as in any engineering or design project, numerous implementation-specific decisions must be made to achieve the developers' specific goals, such as compliance with machine-related, system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "one aspect" or "an embodiment" or "an aspect" of the present invention are not intended to be interpreted as excluding the existence of additional embodiments or aspects that also incorporate the recited features.

As used herein, the term "blade" is intended to be representative of any device that provides a reactive force when in motion relative to a surrounding fluid. As used herein, the term "wind turbine" is intended to be representative of any device that generates rotational energy from wind energy, and more specifically, converts kinetic energy of wind into mechanical energy, or generates electrical power from rotational energy generated from wind energy, and more specifically, converts mechanical energy converted from kinetic energy of wind to electrical power.

Figure 1:
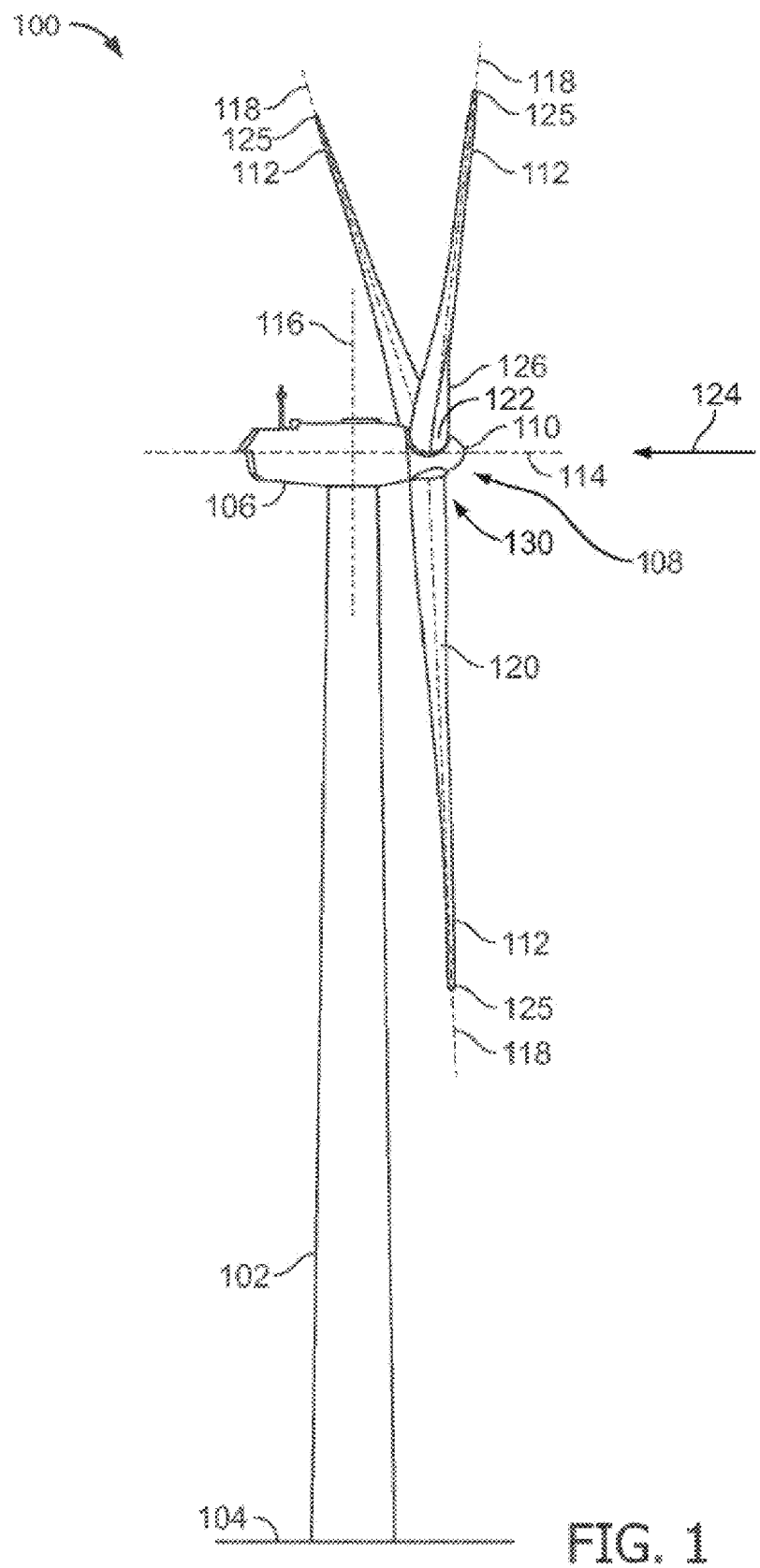
FIG. 1 illustrates a schematic view of an exemplary wind turbine.

FIG. 1 is a schematic view of an exemplary wind turbine 100. Wind turbine 100 is a horizontal-axis wind turbine, however wind turbine 100 could also be a vertical-axis wind turbine. Wind turbine 100 includes a tower 102 extending from and coupled to a supporting surface 104. Tower 102 is coupled to surface 104 by either anchor bolts or by a foundation mounting piece (neither shown). A nacelle 106 is coupled to tower 102, and a rotor 108 is coupled to tower 102 via supporting structure within nacelle 106. Rotor 108 includes a rotatable hub 110 and a plurality of rotor blades 112 coupled to hub 110. In the exemplary embodiment, rotor 108 includes three rotor blades 112. Alternatively, rotor 108 may have any number of rotor blades 112 that enables wind turbine 100 to function as described herein. Tower 102 is any suitable height or construction that enables wind turbine 100 to function as described herein.

Rotor blades 112 are spaced about rotor hub 110 to facilitate rotating rotor 108, thereby transferring kinetic energy from wind 124 into usable mechanical energy, and subsequently, electrical energy. Rotor 108 and nacelle 106 are rotated about tower 102 on a yaw axis 116 to control the perspective of rotor blades 112 with respect to the direction of wind 124. Rotor blades 112 are mated to hub 110 by coupling a blade root portion 120 to hub 110 at a plurality of load transfer regions 122. Load transfer regions 122 each have a hub load transfer region and a blade load transfer region (both not shown in FIG. 1). Loads induced to rotor blades 112 are transferred to hub 110 by load transfer regions 122. Each rotor blade 112 also includes a blade tip portion 125.

Rotor blades 112 may have a length of between about 30 meters (m) (98 feet (ft)) and about 50 m (164 ft) or more. Alternatively, rotor blades 112 may have any length that enables the wind turbine to function as described herein. As wind 124 contacts each rotor blade 112, blade lift forces are induced to each rotor blade 112 and rotation of rotor 108 about an axis of rotation 114 is induced as blade tip portions 125 are accelerated.

A pitch angle (not shown) of rotor blades 112, i.e., an angle that determines a perspective of each rotor blade 112 with respect to a direction of wind 124, may be changed by a pitch assembly 130. Specifically, increasing a pitch angle of rotor blade 112 decreases an amount of blade surface area 126 exposed to wind 124 and, conversely, decreasing a pitch angle of rotor blade 112 increases an amount of blade surface area 126 exposed to wind 124. The pitch angles of rotor blades 112 are adjusted about a pitch axis 118 for each rotor blade 112. In the exemplary embodiment, the pitch angles of rotor blades 112 are controlled individually. Alternatively, the pitch of rotor blades 112 may be controlled as a group.

Figure 2:
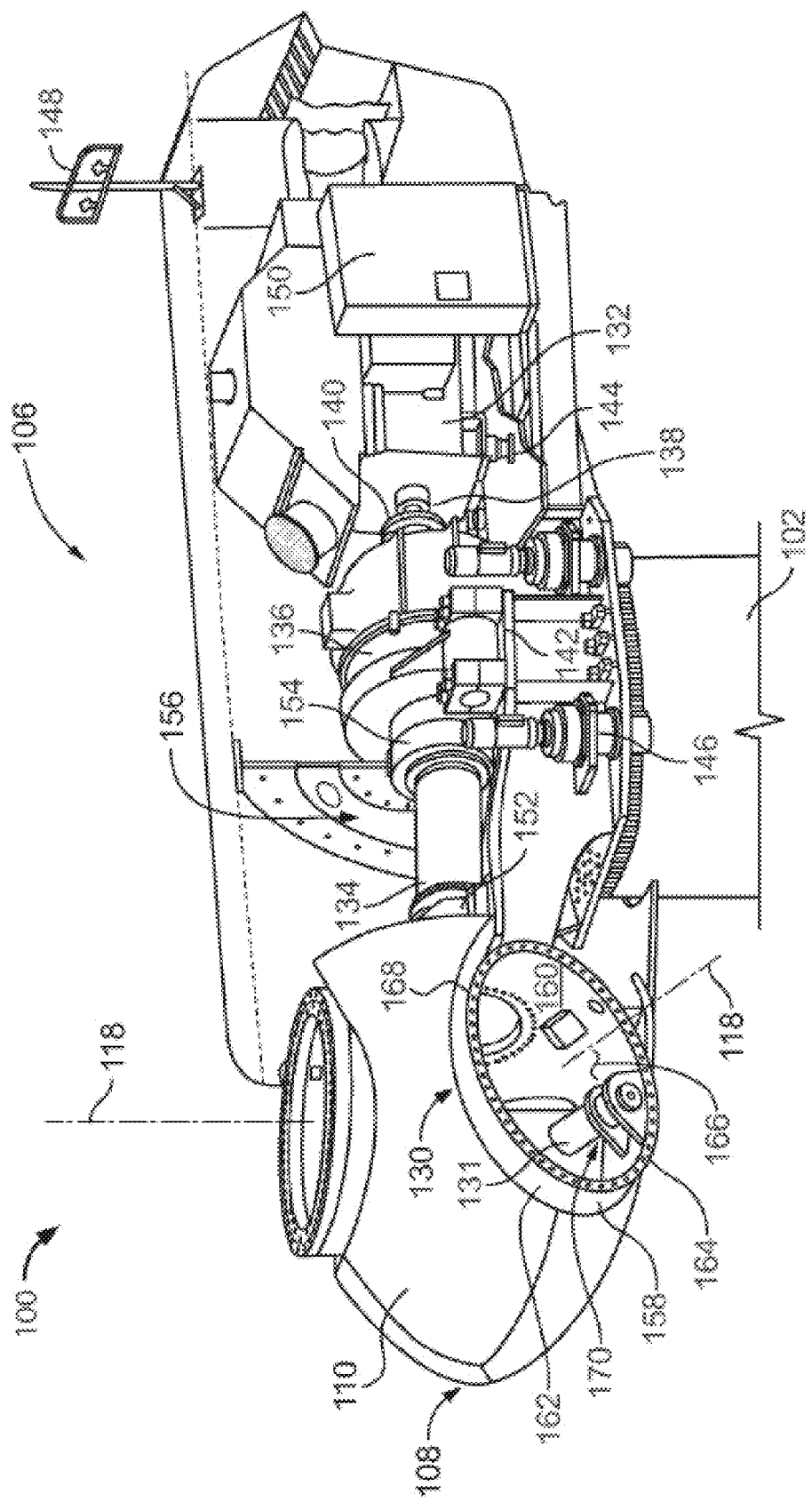
FIG. 2 illustrates a cross-sectional schematic view of an exemplary nacelle suitable for use with the wind turbine shown in FIG. 1.

FIG. 2 is a cross-sectional schematic view of nacelle 106 of wind turbine 100. Various components of wind turbine 100 are housed in nacelle 106. In the exemplary embodiment, nacelle 106 includes three pitch assemblies 130 that are each coupled to a respective rotor blade 112 (shown in FIG. 1), wherein pitch assembly 130 modulates the pitch of associated rotor blade 112 along pitch axis 118. Only one of three pitch assemblies 130 is illustrated in FIG. 2.

Each pitch assembly 130 includes at least one pitch drive motor 131. Pitch drive motor 131 is any motor driven by electrical power and/or a hydraulic system that enables pitch assembly 130 to function as described herein. Alternatively, pitch assembly 130 may include any suitable structure, configuration, arrangement, and/or components such as, but not limited to, hydraulic cylinders, springs, and/or servo-mechanisms. Moreover, pitch assembly 130 may be driven by any suitable means such as, but not limited to, hydraulic fluid, and/or mechanical power, such as, but not limited to, induced spring forces and/or electromagnetic forces.

Rotor 108 is rotatably coupled to an electric generator 132 positioned within nacelle 106 by rotor shaft 134 (sometimes referred to as either a main shaft or a low speed shaft), a gearbox 136, a high speed shaft 138, and a coupling 140. Rotation of rotor shaft 134 rotatably drives gearbox 136 that subsequently drives high speed shaft 138. High speed shaft 138 rotatably drives generator 132 with coupling 140 and rotation of high speed shaft 138 facilitates production of electrical power by generator 132. Gearbox 136 and generator 132 are supported by supports 142 and 144, respectively. In the exemplary embodiment, gearbox 136 utilizes a dual path geometry to drive high speed shaft 138. Alternatively, rotor shaft 134 is coupled directly to generator 132 with coupling 140.

Nacelle 106 also includes a yaw drive 146 that may be used to rotate nacelle 106 and rotor 108 on yaw axis 116 (shown in FIG. 1) to control the perspective of rotor blades 112 with respect to the direction of wind 124. Nacelle 106 also includes at least one meteorological mast 148 that includes a wind vane and anemometer (neither shown in FIG. 2). Mast 148 provides information to a turbine control system 150 that may include wind direction and/or wind speed. Pitch assembly 130 is coupled to control system 150 for control thereby. In the exemplary embodiment, nacelle 106 also includes main, or forward and aft, support bearings 152 and 154, respectively.

Support bearings 152 and 154 facilitate radial support and alignment of rotor shaft 134. Forward support bearing 152 is coupled to rotor shaft 134 near hub 110. Aft support bearing 154 is positioned on rotor shaft 134 near gearbox 136 and/or generator 132. Alternatively, nacelle 106 includes any number of support bearings that enable wind turbine 100 to function as disclosed herein. Rotor shaft 134, generator 132, gearbox 136, high speed shaft 138, coupling 140, and any associated fastening, support, and/or securing device including, but not limited to, supports 142 and 144, and support bearings 152 and 154, are sometimes referred to as a drive train 156.

Hub 110 includes an outer wall 158 that includes an inner surface 160, an outer surface 162, and a bearing surface 164. Inner surface 160 defines a hub cavity 166. Pitch assembly 130 further includes a pitch bearing 168 and a one or more pitch gearbox brackets 170 for positioning pitch motor 131 adjacent to pitch bearing 168. Pitch bearing 168 is coupled to hub 110 and to rotor blade 112 (shown in FIG. 1), for rotating rotor blade 112 about pitch axis 118. For example, pitch bearing 168 may be coupled to hub 110 such that pitch bearing 168 is positioned adjacent to bearing surface 164. In the exemplary embodiment, a pitch gearbox bracket 170 is coupled to hub inner surface 160 such that pitch motor 131 is positioned within hub cavity 166. In an alternative embodiment, pitch gearbox bracket 170 is coupled to hub outer surface 162, such that pitch motor 131 is positioned outside hub 110.

Figure 3:
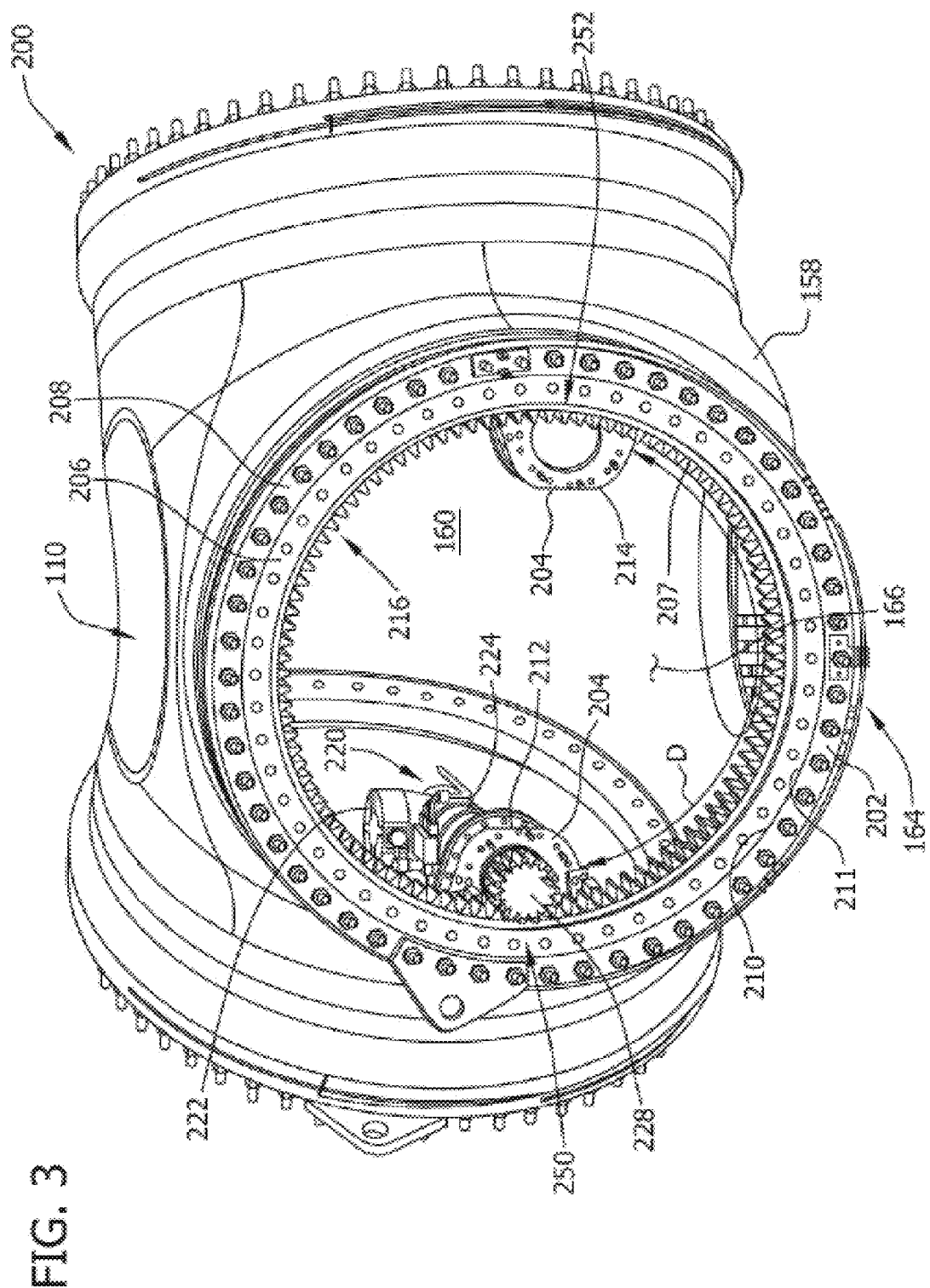
FIG. 3 illustrates a perspective view of an exemplary pitch assembly suitable for use with the wind turbine shown in FIG. 1.
Figure 4:
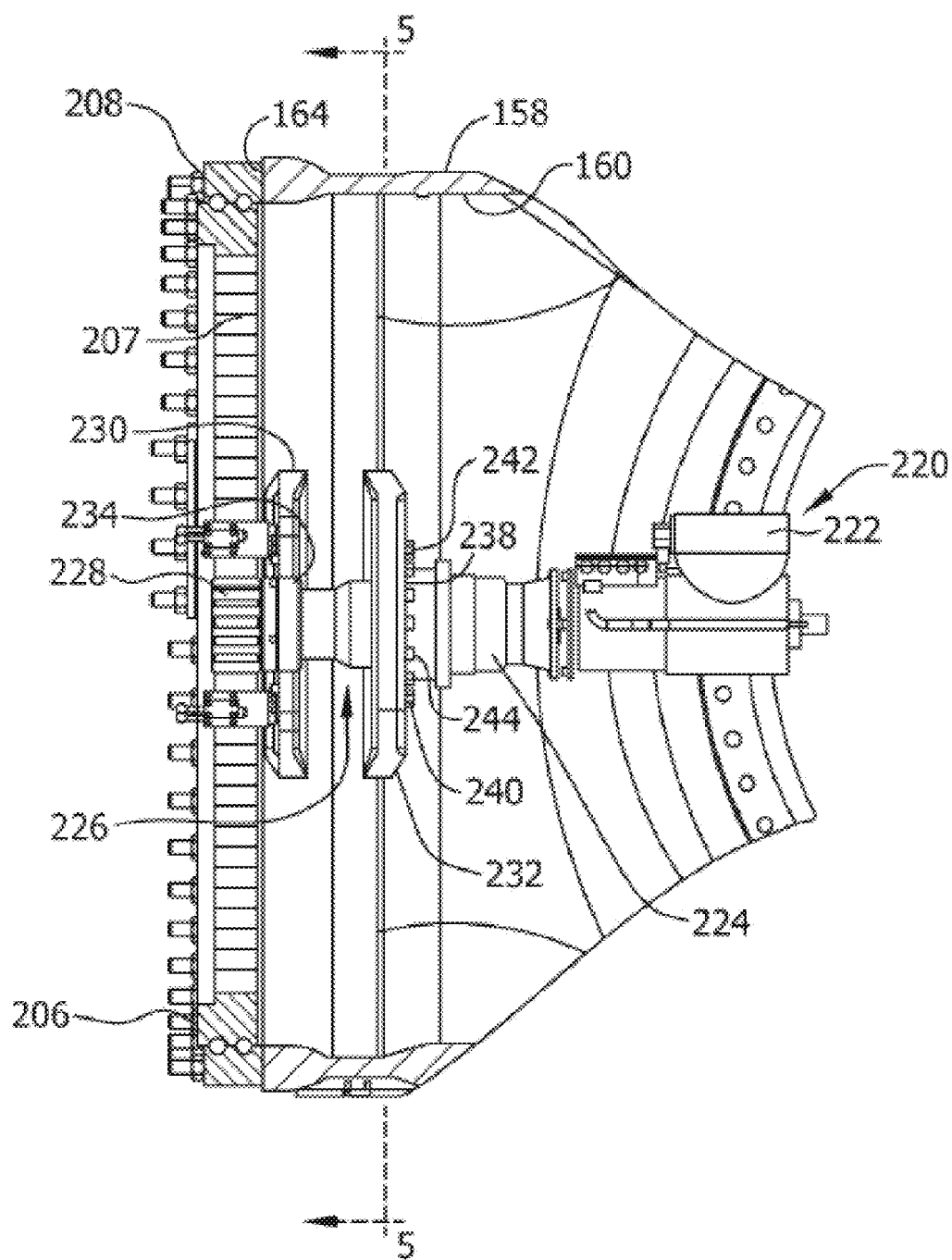
FIG. 4 illustrates an enlarged schematic view of an exemplary pitch gearbox bracket suitable for use with the pitch assembly shown in FIG. 3.
Figure 5:
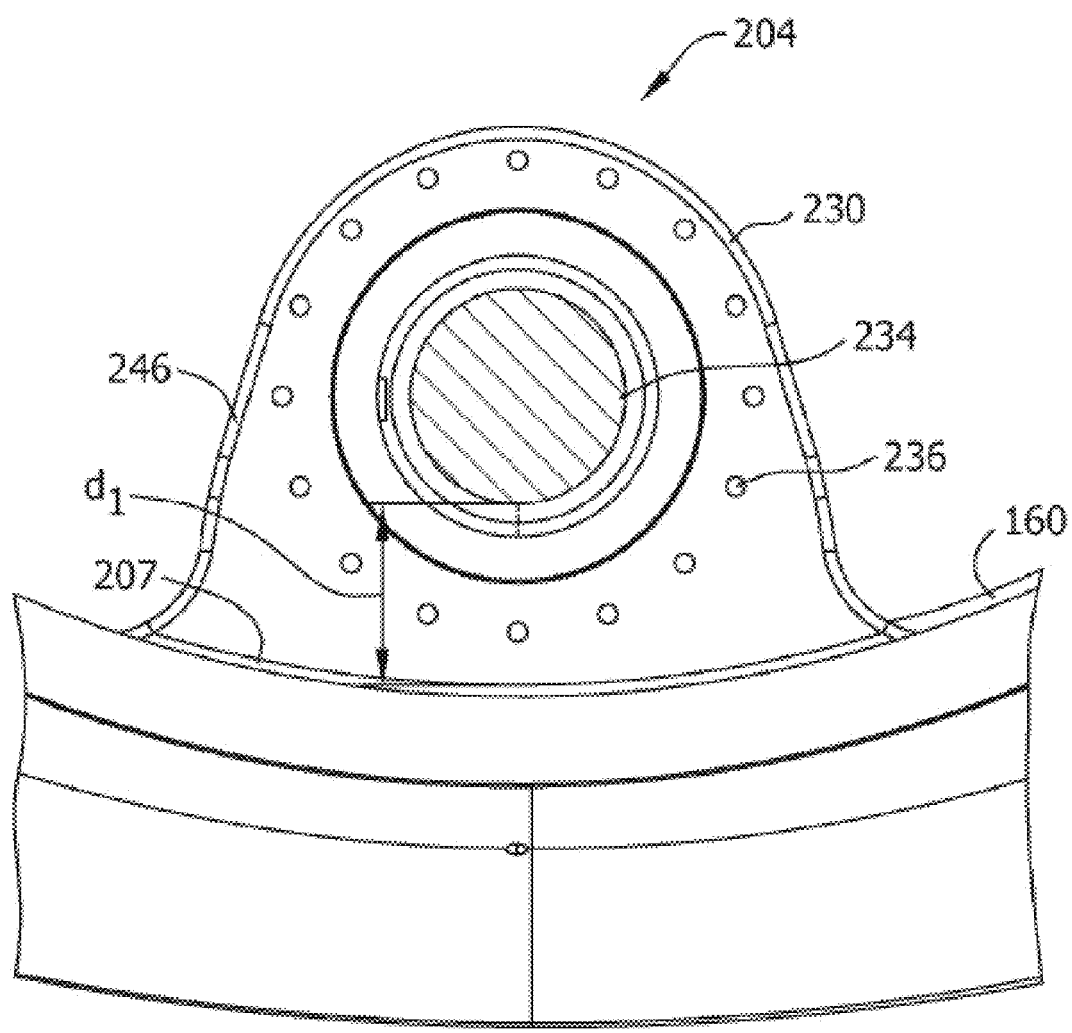
FIG. 5 illustrates an enlarged cross-section view of exemplary pitch gearbox brackets suitable for use with the pitch assembly shown in FIG. 3.

FIG. 3 is a perspective view of a pitch assembly 200 that is suitable for use in wind turbine 100. FIG. 4 is an enlarged cross-sectional view of pitch assembly 200. FIG. 5 is an enlarged cross-section view of a pitch gearbox bracket 204 (taken along line 5-5). Pitch assembly 200 includes a pitch bearing 202 and one or more pitch gearbox brackets 204. Pitch bearing 202 is rotatably coupled to hub outer wall 158 or hub 110, such that pitch bearing 202 is rotatable about pitch axis 118.

Pitch bearing 202 includes an inner race 206 positioned radially inward to, and substantially concentric with, an outer race 208. Inner race 206 is rotatably coupled to outer race 208 such that inner race 206 rotates relative to outer race 208 about pitch axis 118. Outer race 208 is securely coupled to hub outer wall 158 or hub 110. For example, outer race 208 may be coupled to hub outer wall 158 using a plurality of fasteners, such as bolts and nuts. Alternatively, outer race 208 is coupled to hub outer wall 158 by methods that include, but are not limited to, retention hardware, welds, and/or sealing methods and apparatus known in the art.

In the exemplary embodiment, outer race 208 is coupled to hub outer wall 158, such that outer race 208 is in substantial contact with bearing surface 164. An annular groove 210 is defined between inner race 206 and outer race 208 and includes at least one material 211 that facilitates reducing friction between inner race 206 and outer race 208. Material 211 is at least one of bearing balls, rollers, low friction material and/or a lubricant.

The pitch gearbox bracket 204 is positioned within hub cavity 166 and is coupled to hub inner surface 160. As one example only, pitch assembly 200 includes a first pitch gearbox bracket 212 and a second pitch gearbox bracket 214. However, many pitch assemblies only include a single pitch gearbox bracket. First pitch gearbox bracket 212 is positioned substantially opposite second pitch gearbox bracket 214 along a circumference 216 of pitch bearing 202. In an alternative embodiment, pitch assembly 200 includes multiple pitch gearbox brackets 204 that are spaced a circumferential distance D apart from each other about pitch bearing 202. In an alternative embodiment, the plurality of pitch gearbox brackets 204 are spaced at any distance that enables pitch assembly 200 to function as described herein. Multiple pitch gearbox brackets may be used for multiple pitch motors, or a secondary (or additional) pitch gearbox bracket may be employed as a backup location for the pitch motor.

The pitch gearbox bracket 204 is coupled to hub inner surface 160 using a weld, however, the pitch gearbox bracket 204 may be coupled to hub inner surface 160 by methods that include, but are not limited to, retention hardware, and sealing methods such that the pitch gearbox bracket 204 is securely coupled to hub inner surface 160. In a further embodiment the pitch gearbox bracket 204 may be formed integral with hub 110. Rotor blade 112 (shown in FIG. 1) is removably coupled to inner race 206 using a plurality of bolts. Alternatively, rotor blade 112 may be coupled to inner race 206 using any methods known in the art that enable rotor blade 112 to be removed from inner race 206.

Pitch assembly 200 also includes a pitch drive system 220 that includes a pitch drive motor 222, a pitch gearbox 224, a pitch drive shaft 226, and a pitch drive pinion 228. Pitch drive motor 222 is coupled to pitch gearbox 224 such that pitch drive motor 222 imparts mechanical force to pitch gearbox 224. Pitch gearbox 224 is coupled to pitch drive shaft 226 and pitch drive shaft 226 is coupled to pitch drive pinion 228, such that pitch drive pinion 228 is rotated by pitch gearbox 224, with pitch drive shaft 226.

Inner race 206 includes a plurality of pitch bearing teeth 207 spaced circumferentially about inner race 206. Pitch bearing teeth 207 engage pitch drive pinion 228 such that the rotation of pitch drive pinion 228 causes rotation of inner race 206 of pitch bearing 202. First pitch gearbox bracket 212 is coupled to pitch drive system 220, such that first pitch gearbox bracket 212 supports pitch drive system 220 and retains pitch drive system 220 in a fixed position relative to pitch bearing 202. More specifically, first pitch gearbox bracket 212 is sized to receive pitch drive system 220 therein.

In the exemplary embodiment first pitch gearbox bracket 212 is substantially similar to second pitch gearbox bracket 214. First pitch gearbox bracket 212 includes a first member 230 and a second member 232. First member 230 is coupled to hub inner surface 160 and extends substantially-radially inward from hub inner surface 160. First member 230 includes a central opening 234 and a plurality of bores 236. Central opening 234 is positioned substantially concentric within first member 230 and extends at least partially therethrough. Central opening 234 is sized and shaped to receive pitch drive shaft 226 and pitch drive pinion 228.

Pitch drive pinion 228 is rotatably coupled to first member 230 and is positioned between first member 230 and pitch bearing 202. Pitch drive pinion 228 is inserted through central opening 234 and is aligned concentric to central opening 234. Central opening 234 is positioned a distance $d_1$ from hub inner surface 160 such that pitch drive pinion 228 contacts pitch bearing teeth 207. Bores 236 are positioned radially outward from central opening 234 and are aligned substantially circumferentially about central opening 234.

Second member 232 is coupled to hub inner surface 160 and extends substantially-radially inward from hub inner surface 160 and is aligned substantially perpendicular to hub inner surface 160. Second member 232 includes a central opening 238 and a plurality of bores 240, and is aligned to first member 230, such that first member central opening 234 is concentrically-aligned with second member central opening 238. Second member 232 is positioned between first member 230 and pitch drive motor 222, such that pitch drive shaft 226 is coupled to first member 230 and second member 232. Central opening 238 is sized and shaped to receive pitch drive shaft 226 and pitch gearbox 224.

Bores 240 are circumferentially positioned about central opening 238. Pitch gearbox 224 includes at least one opening 242 that is sized and shaped to receive at least one bolt 244. Bolt 244 is inserted through opening 242 and into a corresponding bore 240 to securely couple pitch gearbox 224 to second member 232, such that first pitch gearbox bracket 212 facilitates reducing pitch assembly 200 from moving relative to hub 110. In the exemplary embodiment, first member 230 and second member 232 include a bell-shaped flange 246. In an alternative embodiment, first member 230 and second member 232 may have any shape that enables pitch assembly 200 to operate as described herein.

Pitch drive system 220 uses pitch drive motor 222 to change the pitch angle of rotor blades 112 by rotating rotor blades 112 with respect to hub 110 and outer race 208. More specifically, in the exemplary embodiment, pitch drive pinion 228 is coupled to pitch bearing 202 such that rotation of pitch drive system 220 rotates pitch bearing 202 and rotor blade 112 about pitch axis 118 to change the pitch of rotor blade 112. During operation of wind turbine generator 100, pitch drive system 220 rotates each rotor blade 112 a limited distance about pitch axis 118, such that pitch drive pinion 228 contacts a limited number of pitch bearing teeth 207.

In an alternative embodiment, inner race 206 is securely coupled to hub outer wall 158 and is positioned in contact with bearing surface 164. In such an embodiment, outer race 208 is rotatably coupled to inner race 206, such that outer race 208 rotates relative to inner race 206. In this alternative embodiment, pitch gearbox brackets 204 are coupled to hub outer surface 162, such that pitch drive system 220 is positioned outside hub cavity 166 and is coupled to outer race 208. Rotor blade 112 is coupled to outer race 208, such that pitch drive system 220 rotates rotor blade 112 about pitch axis 118.

During operation of pitch drive system 220, a first set 250 of pitch bearing teeth 207 that contact pitch drive pinion 228 may become worn and may not be able to translate rotational force from pitch drive system 220 to pitch bearing 202. Therefore, it becomes necessary to relocate pitch drive system 220 within hub 110, such that pitch drive system 220 rotates pitch bearing 202 by a second set 252 of pitch bearing teeth 207 that is different than first set 250. More specifically, pitch drive system 220 is selectively coupled to one of first set 250 and second set 252 of pitch bearing teeth 207, such that pitch drive system 220 contacts a predetermined set of pitch bearing teeth 207. Further, pitch drive system 220 is uncoupled from first pitch gearbox bracket 212, is inserted through second pitch gearbox bracket 214, and is securely coupled to second pitch gearbox bracket 214, wherein pitch drive pinion 228 is realigned adjacent to and in contact with second set 252 such that a new set of pitch bearing teeth 207 is utilized.

Figure 6:
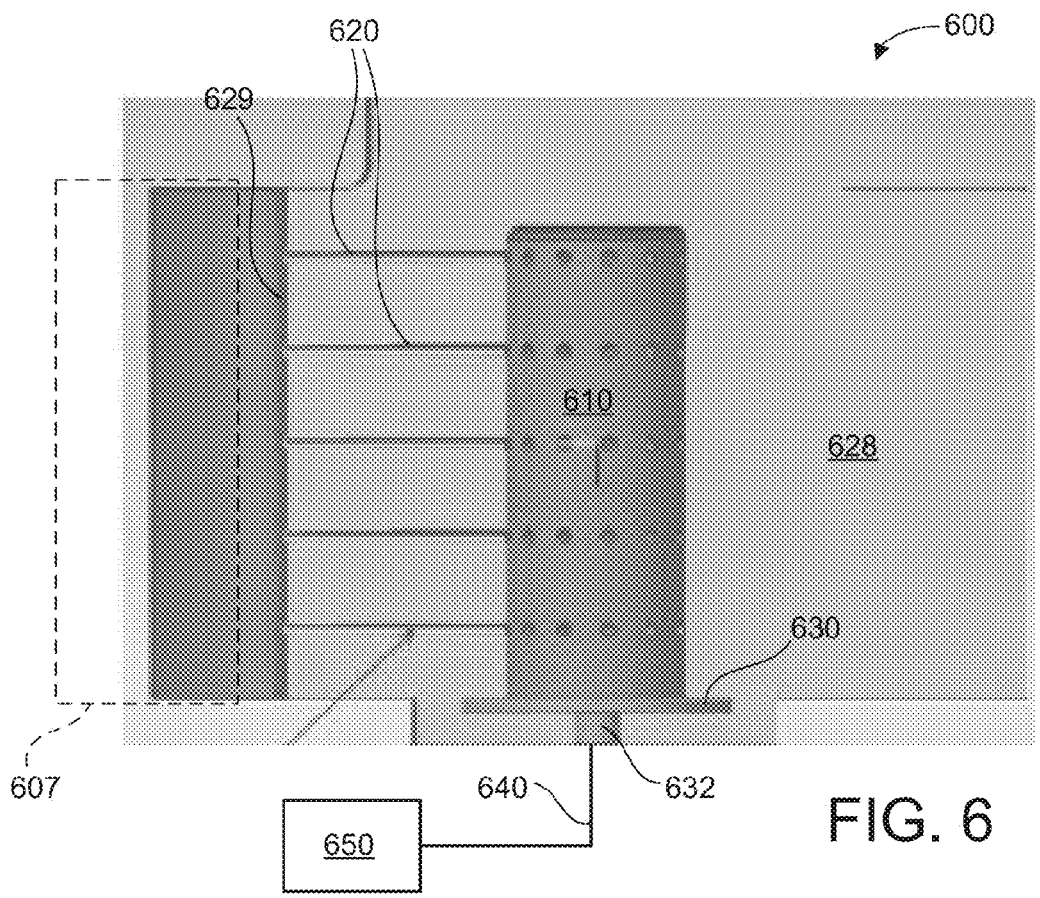
FIG. 6 illustrates a cross-sectional view of a system for lubricating gears, according to an aspect of the present invention.

Many wind turbines do not include a secondary or backup pitch gearbox bracket. In these applications, a new approach is required to increase the longevity of the first set 250 of pitch bearing teeth by reducing wear. FIG. 6 illustrates a cross-sectional view of a system 600 for lubricating gears, according to an aspect of the present invention. The system 600 includes a drive pinion 628 configured to interact with bearing teeth 607. The drive pinion 628 may be a pitch or yaw drive pinion in a wind turbine. The drive pinion 628 includes an internal lubricant container 610 connected to a plurality of lubricant delivery conduits 620. The lubricant delivery conduits 620 extend from the internal lubricant container 610 radially outward to a radial surface 629 of the drive pinion 628. The system 600 is configured to transport lubricant (e.g., grease) from the internal lubricant container 610 through the lubricant delivery conduits 620 to the radial surface 629 to lubricate the drive pinion 628 and the bearing teeth 607.

A container cover 630 is disposed at one end of the internal lubricant container 610, and the container cover 630 includes a lubricant inlet 632. The lubricant inlet 632 may be a grease fitting, grease nipple, zerk fitting, alemite fitting or any suitable connection for connecting to a lubricant or grease supply. Optionally, the drive pinion 628 may be connected to a lubricant supply conduit 640 via lubricant inlet 632. The lubricant supply conduit may be connected to a lubricant supply 650.

Figure 7:
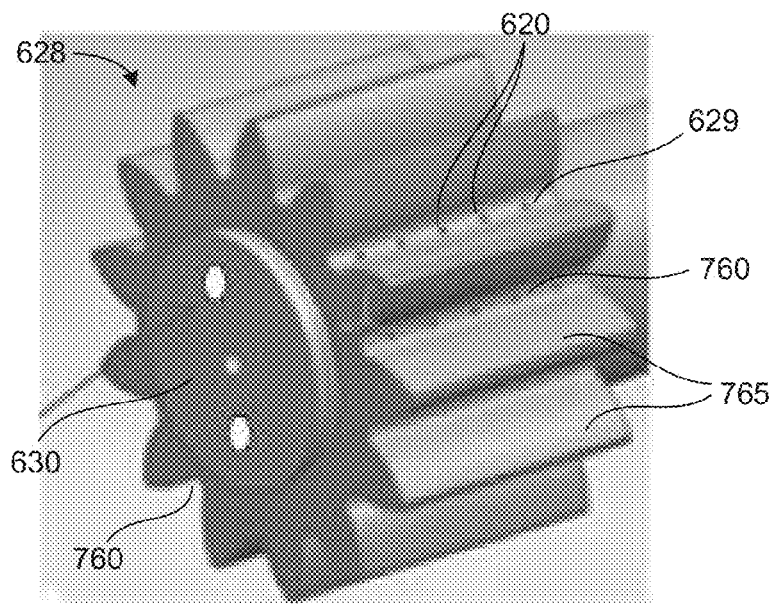
FIG. 7 illustrates a perspective view of the drive pinion, according to an aspect of the present invention.

FIG. 7 illustrates a perspective view of the drive pinion 628, according to an aspect of the present invention. The lubricant delivery conduits 620 terminate in the radial surface 629 in valleys 760 located between teeth 765 of the drive pinion 628. This arrangement allows the lubricant (e.g., grease) to be delivered where it is needed most and this location also allows for quick distribution of the lubricant by the meshing gear teeth of the bearing and drive pinion. However, the lubricant delivery conduits 620 could be routed to terminate anywhere along the tooth 765 surface, as desired in the specific application.

Figure 8:
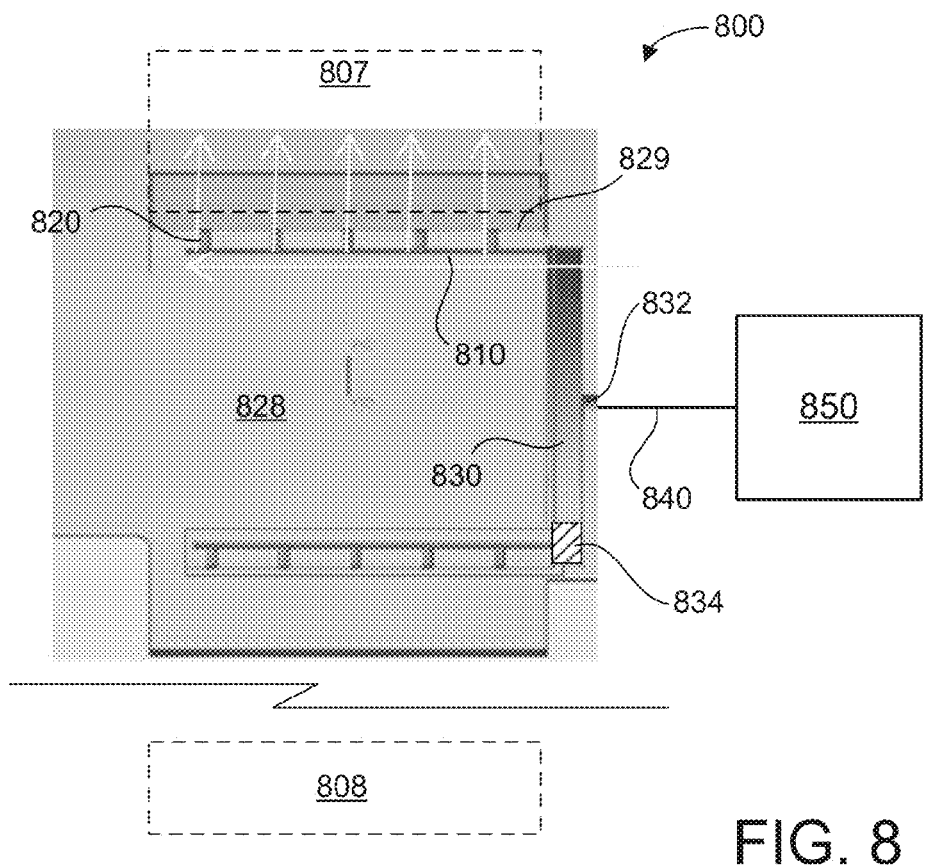
FIG. 8 illustrates a cross-sectional view of the drive pinion and system, according to an aspect of the present invention.

FIG. 8 illustrates a cross-sectional view of the drive pinion 828 and system 800, according to an aspect of the present invention. The system 800 for lubricating gears includes a drive pinion 828 configured to interact with bearing teeth 807. The drive pinion 828 may be a pitch drive pinion for use in a wind turbine. The drive pinion 828 includes an internal axially extending lubricant channel 810 connected to a plurality of radially extending lubricant delivery conduits 820. The lubricant delivery conduits 820 extend from the internal axially extending lubricant channel 810 radially outward to a radial surface 829 of the drive pinion 828. The system 800 is configured to transport lubricant from the internal lubricant channel 810 through the lubricant delivery conduits 820 to the radial surface 829 to lubricate the drive pinion 828 and the bearing teeth 807.

The system 800 also includes a distributor 830 disposed at an axial end of the drive pinion 828. The distributor 830 includes a lubricant inlet 832, which may be a grease fitting, grease nipple, zerk fitting, alemite fitting or any suitable connection for connecting to a lubricant or grease supply. The distributor 830 is configured to direct lubricant (e.g., grease) to meshing teeth 807 (shown at the top of FIG. 8) and to restrict flow of the lubricant to non-meshing teeth 808 (shown at the bottom of FIG. 8) of the bearing. Blocking element 834 blocks or restricts lubricant flow into the lubricant channel 810 and delivery conduits 820 when those elements are not aligned with meshing teeth 807. The system 800 may also include a lubricant supply conduit 840 connected to the lubricant inlet 832 and to a lubricant supply or reservoir 850.

Figure 9:
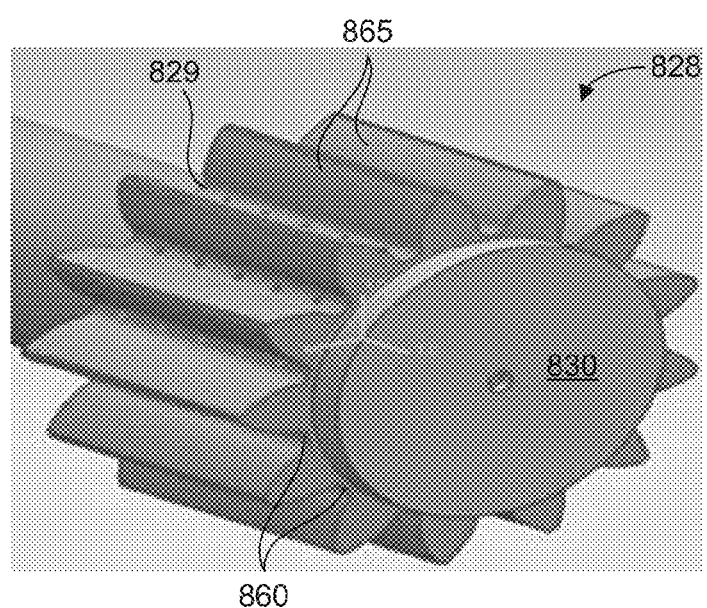
FIG. 9 illustrates a perspective view of the drive pinion, according to an aspect of the present invention.

FIG. 9 illustrates a perspective view of the drive pinion 828, according to an aspect of the present invention. The lubricant delivery conduits 820 terminate in the radial surface 829 in valleys 860 located between teeth 865 of the drive pinion 828. This arrangement allows the lubricant (e.g., grease) to be delivered where it is needed most and this location also allows for quick distribution of the lubricant by the meshing gear teeth of the bearing and drive pinion. However, the lubricant delivery conduits 820 could be routed to terminate anywhere along the tooth 865 or valley 860 surfaces, as desired in the specific application.

Figure 10:
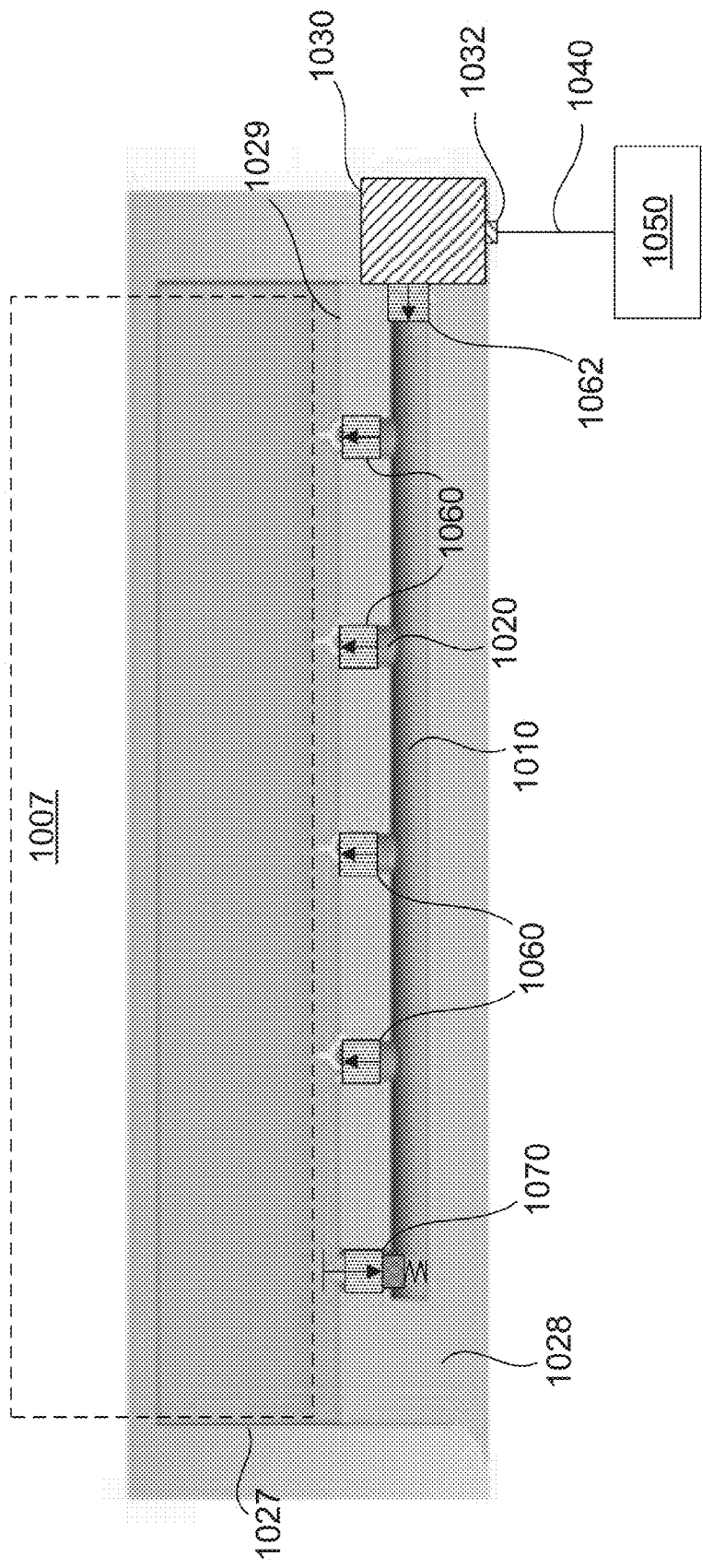
FIG. 10 illustrates a partial, cross-sectional view of the drive pinion and system, according to an aspect of the present invention.

FIG. 10 illustrates a partial, cross-sectional view of the drive pinion 1028 and system 1000, according to an aspect of the present invention. The drive pinion 1028 is configured to interact with bearing teeth 1007. The drive pinion 1028 may be a pitch drive pinion in a wind turbine. The drive pinion 1028 includes an internal axially extending lubricant channel 1010 connected to a plurality of radially extending lubricant delivery conduits 1020. Each of the radially extending lubricant delivery conduits 1020 extend from the internal axially extending lubricant channel 1010 radially outward to a radial surface 1029 of the drive pinion 1028.

A plurality of check valves 1060 are located in at least some of the radially extending lubricant delivery conduits 1020. The check valves 1060 are configured to permit lubrication flow only in a radially outward direction, towards the meshing bearing teeth 1007. A trigger switch activated piston 1070 is located in one of the radially extending lubricant delivery conduits 1020, and the trigger switch activated piston 1070 is configured to increase lubrication pressure within the axially extending lubricant channel 1010 during meshing of the drive pinion and the bearing teeth. As the drive pinion teeth 1027 mesh with the bearing teeth 1007, the trigger switch is activated and pushes the piston radially downward, thereby increasing lubrication pressure in lubricant channel 1010 and forcing lubricant radially outward of delivery conduits 1020 and through one-way check valves 1060. Conversely, as the drive pinion teeth 1027 un-mesh with the bearing teeth 1007, the trigger switch is de-activated and the piston moves radially upward, thereby decreasing lubrication pressure in lubricant channel 1010 and drawing lubricant through check valve 1062 and from lubricant container 1030. In this manner, the system 1000 is configured to transport lubricant from the internal axially extending lubricant channel 1010 through the plurality of radially extending lubricant delivery conduits 1020 to the radial surface 1029 to lubricate the drive pinion 1028 and the bearing teeth 1007. It is also to be understood that the trigger switch 1070 could also be combined with a check valve 1060 to provide both check valve and trigger switch activated piston capabilities.

The system 1000 also may include a lubricant container 1030 disposed at an axial end of the drive pinion 1028. The lubricant container includes a lubricant inlet 1032 and a check valve 1062 configured to permit lubricant flow only out of the lubricant container 1030. The check valve 1062 is fluidly connected to the internal axially extending lubricant channel 1010. Optionally, a lubricant supply conduit 1040 may be connected to the lubricant inlet 1032 and a lubricant supply or reservoir 1050. As described previously, the plurality of radially extending lubricant delivery conduits 1020 terminate in the radial surface 1029 in valleys located between teeth of the drive pinion.

Figure 11:
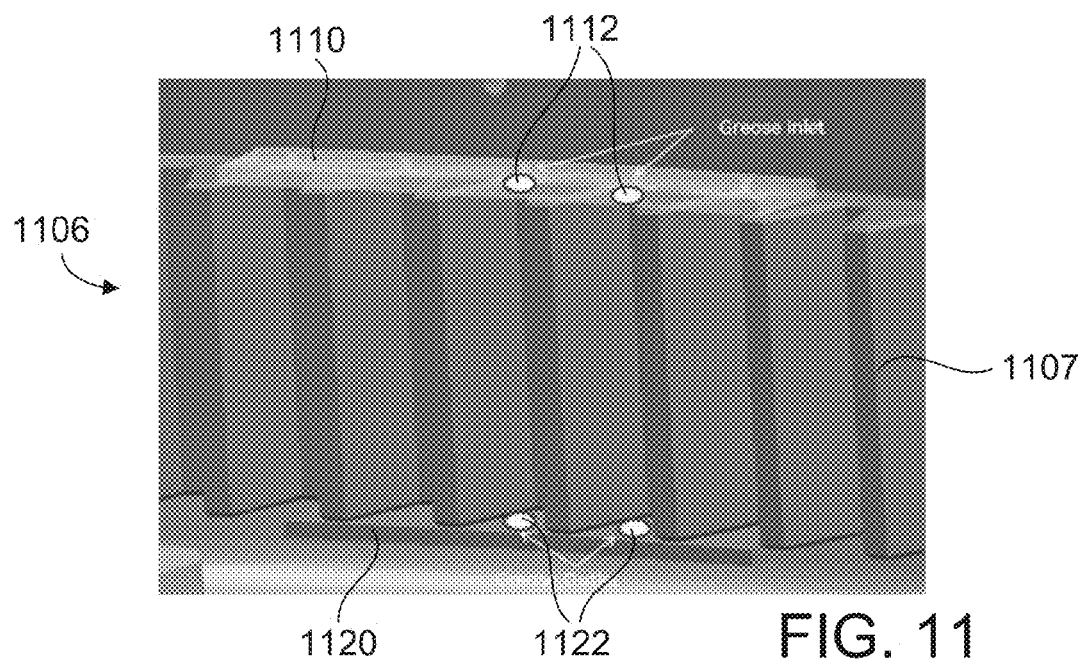
FIG. 11 illustrates a partial, perspective view of bearing teeth having two lubrication retention plates installed thereon, according to an aspect of the present invention.
Figure 12:
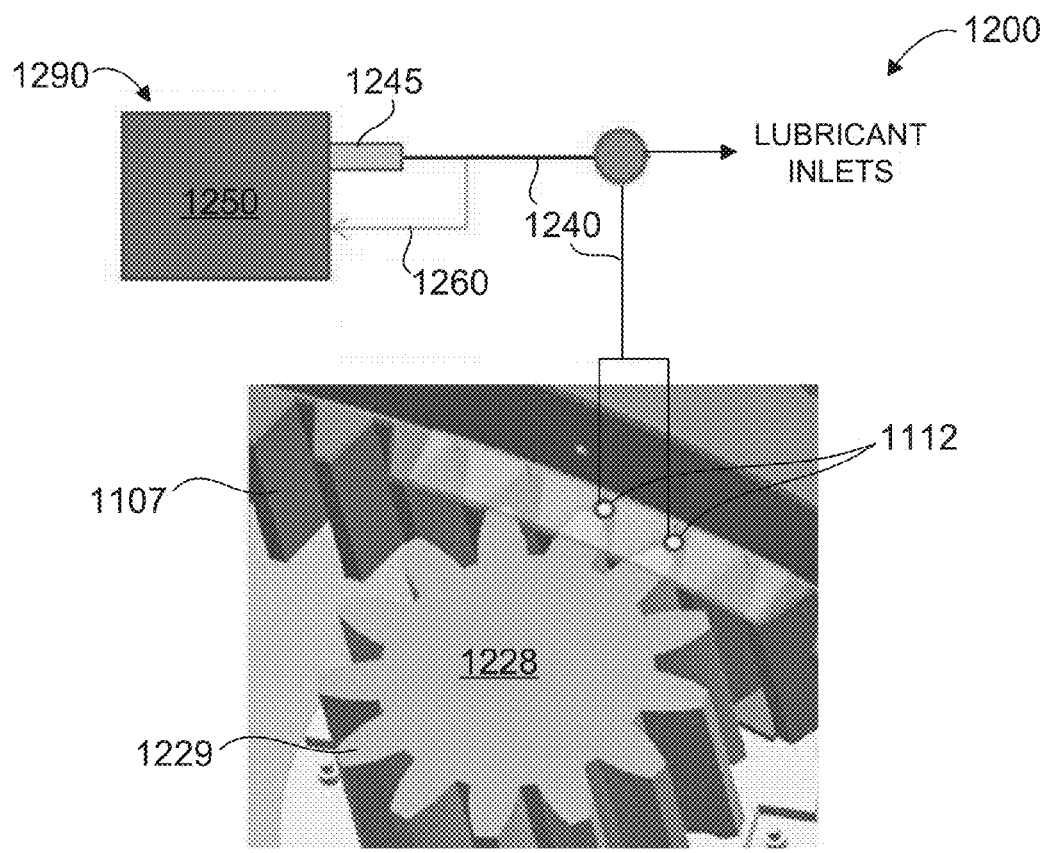
FIG. 12 illustrates a perspective and schematic view of a system incorporating the lubrication retention plates of FIG. 11, according to an aspect of the present invention.

FIG. 11 illustrates a partial, perspective view of bearing teeth 1107 having two lubrication retention plates installed thereon, according to an aspect of the present invention. FIG. 12 illustrates a perspective and schematic view of a system 1200 incorporating the lubrication retention plates of FIG. 11, according to an aspect of the present invention. The system 1200 includes a drive pinion 1228 having a plurality of pinion teeth 1229. The drive pinion 1228 may be a pitch drive pinion in a wind turbine. A bearing 1106 includes a plurality of bearing teeth 1107, and the bearing 1106 is configured for use with the drive pinion 1228.

A first plate 1110 is attached to a first axial side of the plurality of bearing teeth 1107 in a vicinity of the drive pinion 1228. The first plate 1110 includes one or more lubricant inlets 1112. A second plate 1120 is attached to a second axial side of the plurality of bearing teeth 1107 in a vicinity of the drive pinion 1228. The second plate 1120 includes one or more lubricant outlets 1122. The second plate 1120 is located substantially opposite to the first plate 1110. The first plate 1110 and the second plate 1120 are configured to retain lubricant around a portion of the plurality of pinion teeth 1229 and the plurality of bearing teeth 1107 contained between the first plate 1110 and second plate 1120. The lubricant inlets 1112 may be connected to a lubricant supply system 1290. The lubricant supply system 1290 may include one or more lubricant supply conduits 1240, a pump 1245 and a lubricant supply or reservoir 1250. An over-pressure return line 1260 may be connected between the lubricant supply conduit 1240 and the lubricant supply reservoir 1250. The first plate 1110 and second plate 1120 could also be attached to the drive pinion system, and they may be configured to rotate with or not rotate with the bearings.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art, such as any gear requiring lubrication including those not in wind turbine applications. Such other examples are intended to be within the scope of the claims if they have structural elements that do not differ from the literal language of the claims, or if they include equivalent structural elements with insubstantial differences from the literal languages of the claims.

The invention claimed is:

1. A system for lubricating gears, the system comprising:
a drive pinion configured to interact with bearing teeth, the drive pinion comprising an internal axially extending lubricant channel connected to a plurality of radially extending lubricant delivery conduits, the plurality of radially extending lubricant delivery conduits extending from the internal axially extending lubricant channel radially outward to a radial surface of the drive pinion;
a plurality of check valves located in at least some of the radially extending lubricant delivery conduits, the plurality of check valves configured to permit lubrication flow only in a radially outward direction, and towards the bearing teeth, and a trigger switch activated piston located in one of the radially extending lubricant delivery conduits, the trigger switch activated piston configured to increase lubrication pressure within the axially extending lubricant channel during meshing of the drive pinion and the bearing teeth; and
wherein the system is configured to transport lubricant from the internal lubricant channel through the plurality of lubricant delivery conduits to the radial surface to lubricate the drive pinion and the bearing teeth.

2. The system of claim 1, further comprising a distributor disposed at an axial end of the drive pinion, the distributor including a lubricant inlet, and
wherein the distributor is configured to direct lubricant to meshing teeth and to restrict flow of the lubricant to non-meshing teeth.

3. The system of claim 2, further comprising a lubricant supply conduit connected to the lubricant inlet.

4. The system of claim 1, wherein the drive pinion is a pitch drive pinion in a wind turbine.

5. The system of claim 1, wherein the plurality of lubricant delivery conduits terminate in the radial surface in valleys located between teeth of the drive pinion.

6. The system of claim 1, further comprising:
an internal lubricant container in the drive pinion, the internal lubricant container connected to the plurality of lubricant delivery conduits, the plurality of lubricant delivery conduits extending from the internal lubricant container radially outward to a radial surface of the drive pinion.

7. The system of claim 6, further comprising a container cover disposed at one end of the internal lubricant container, the container cover including a lubricant inlet.

8. The system of claim 7, further comprising a lubricant supply conduit connected to the lubricant inlet.

9. The system of claim 8, wherein the drive pinion is a pitch drive pinion in a wind turbine.

10. The system of claim 9, wherein the plurality of lubricant delivery conduits terminate in the radial surface in valleys located between teeth of the drive pinion.

11. A system for lubricating gears, the system comprising:
a drive pinion configured to interact with bearing teeth, the drive pinion comprising an internal axially extending lubricant channel connected to a plurality of radially extending lubricant delivery conduits, the plurality of radially extending lubricant delivery conduits extending from the internal axially extending lubricant channel radially outward to a radial surface of the drive pinion;
a plurality of check valves located in at least some of the radially extending lubricant delivery conduits, the plurality of check valves are configured to permit lubrication flow only in a radially outward direction;
a trigger switch activated piston located in one of the radially extending lubricant delivery conduits, the trigger switch activated piston configured to increase lubrication pressure within the axially extending lubricant channel during meshing of the drive pinion and the bearing teeth; and
wherein the system is configured to transport lubricant from the internal axially extending lubricant channel through the plurality of radially extending lubricant delivery conduits to the radial surface to lubricate the drive pinion and the bearing teeth.

12. The system of claim 11, wherein the drive pinion is a pitch drive pinion in a wind turbine.

13. The system of claim 11, wherein the plurality of radially extending lubricant delivery conduits terminate in the radial surface in valleys located between teeth of the drive pinion.

* * * * *